United States Patent
Beard et al.

(10) Patent No.: US 11,475,031 B2
(45) Date of Patent: *Oct. 18, 2022

(54) IDENTIFICATION AND COMPILING OF INFORMATION RELATING TO AN ENTITY

(71) Applicant: Palantir Technologies Inc., Palo Alto, CA (US)

(72) Inventors: Mitchell Beard, Falls Church, VA (US); Allen Chang, Mountain View, CA (US); Chris Hammett, Washington, DC (US); Jeremy Liu, Arlington, VA (US); Matthew Elkherj, Menlo Park, CA (US); Ryan Beiermeister, San Francisco, CA (US); Ryan Smith, Vienna, VA (US); Tatyana Gordeeva, Palo Alto, CA (US); William Ayers, Washington, DC (US)

(73) Assignee: Palantir Technologies Inc., Palo Alto, CA (US)

( * ) Notice: Subject to any disclaimer, the term of this patent is extended or adjusted under 35 U.S.C. 154(b) by 651 days.

This patent is subject to a terminal disclaimer.

(21) Appl. No.: 16/389,300

(22) Filed: Apr. 19, 2019

(65) Prior Publication Data

US 2019/0243840 A1 Aug. 8, 2019

Related U.S. Application Data

(63) Continuation of application No. 15/590,956, filed on May 9, 2017, now Pat. No. 10,311,074.

(Continued)

(51) Int. Cl.
*G06F 16/20* (2019.01)
*G06F 16/25* (2019.01)
(Continued)

(52) U.S. Cl.
CPC ............ *G06F 16/25* (2019.01); *G06F 16/248* (2019.01); *G06F 16/2455* (2019.01);
(Continued)

(58) Field of Classification Search
CPC .......... G06F 16/2455; G06F 16/24573; G06F 16/24578; G06F 16/248
See application file for complete search history.

(56) References Cited

U.S. PATENT DOCUMENTS 8,788,405 B1 * 7/2014 Sprague ................ G06F 16/355
705/38
10,311,074 B1 * 6/2019 Beard .................. G06F 16/2455
(Continued)

OTHER PUBLICATIONS

Official Communication for U.S. Appl. No. 15/590,956 dated Aug. 11, 2017.
(Continued)

*Primary Examiner* — Kristopher Andersen
(74) *Attorney, Agent, or Firm* — Sheppard Mullin Richter & Hampton LLP

(57) ABSTRACT

Systems and methods are provided for identifying and compiling information relating to an entity for investigative analysis. The system may comprise one or more processors and a memory storing instructions that, when executed by the one or more processors, cause the system to search, in one or more data sources, with a plurality of known characteristics of an entity to obtain a first plurality of records, identify from the first plurality of records a subset of records that match the known characteristics with a substantial confidence, compile the subset of records to form a unified record representing the entity and conduct a second search with information from the unified record to obtain a second plurality of search results.

19 Claims, 3 Drawing Sheets

Related U.S. Application Data

(60) Provisional application No. 62/434,936, filed on Dec. 15, 2016.

(51) Int. Cl.
| | | |
|---|---|---|
| *G06F 16/248* | (2019.01) | |
| *G06F 16/2455* | (2019.01) | |
| *G06F 16/2457* | (2019.01) | |
| *G06Q 30/02* | (2012.01) | |
| *G06Q 30/00* | (2012.01) | |
| *G06Q 10/00* | (2012.01) | |
| *G06Q 10/06* | (2012.01) | |

(52) U.S. Cl.
CPC .. *G06F 16/24573* (2019.01); *G06F 16/24578* (2019.01); *G06Q 30/02* (2013.01); *G06Q 10/06* (2013.01)

(56) References Cited

U.S. PATENT DOCUMENTS

| | | | |
|---|---|---|---|
| 2010/0281020 A1* | 11/2010 | Drubner | G06Q 30/08 707/722 |
| 2011/0022627 A1 | 1/2011 | Mohan | |
| 2011/0066629 A1* | 3/2011 | Escalante | G06F 16/951 707/765 |
| 2011/0213805 A1* | 9/2011 | Walther | G06F 16/9558 707/780 |
| 2015/0120650 A1 | 4/2015 | Seay | |

OTHER PUBLICATIONS

Official Communication for U.S. Appl. No. 15/590,956 dated Jan. 10, 2018.

Official Communication for U.S. Appl. No. 15/590,956 dated Jul. 2, 2018.

* cited by examiner

IDENTIFICATION AND COMPILING OF INFORMATION RELATING TO AN ENTITY

CROSS REFERENCE TO RELATED APPLICATIONS

This application is a continuation of U.S. application Ser. No. 15/590,956, filed on May 9, 2017, which claims the benefit under 35 U.S.C. § 119(e) of the United States Provisional Application Ser. No. 62/434,936 filed Dec. 15, 2016, the content of which is hereby incorporated by reference in its entirety.

FIELD OF THE INVENTION

This disclosure relates to approaches for identifying and compiling information relating to an entity for investigative analysis.

BACKGROUND

Collection of all available digital records of an entity is useful for investigation, such as by the police department or a potential employer as part of a background check. There is no centralized database that includes all of the relevant records. Further, each record may not be associated with the complete or correct identifying information for the entity, and different databases may have entirely different structure or ontology, making collection of such record challenging.

SUMMARY

Various embodiments of the present disclosure can include systems, methods, and non-transitory computer readable media configured to identify and compile information relating to an entity for investigative analysis. In some embodiments, the systems, methods, and non-transitory computer readable media are configured to implement a method that entails searching, in one or more data sources, with a plurality of known characteristics of an entity to obtain a first plurality of records, identifying, from the first plurality of records, a subset of records that match the known characteristics with a substantial confidence, compiling the subset of records to form a unified record representing the entity, and conducting a second search with information from the unified record to obtain a second plurality of search results.

In some embodiments, the method further comprises presenting, on an interface, at least part of the records from the first plurality and the second plurality, wherein the interface is configured to allow a user to annotate the records. In some embodiments, the annotation comprises confirmation that a record is associated with the entity. In some embodiments, the method further comprises storing the annotation in a library in a non-transitory medium. In some embodiments, the method further comprises ranking the records before presenting the records on the interface.

In some embodiments, the records of the subset are those that have perfect match to the known characteristics. In some embodiments, the method further comprises generating variations of the known characteristics as additional queries for the search.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

Figure 1:
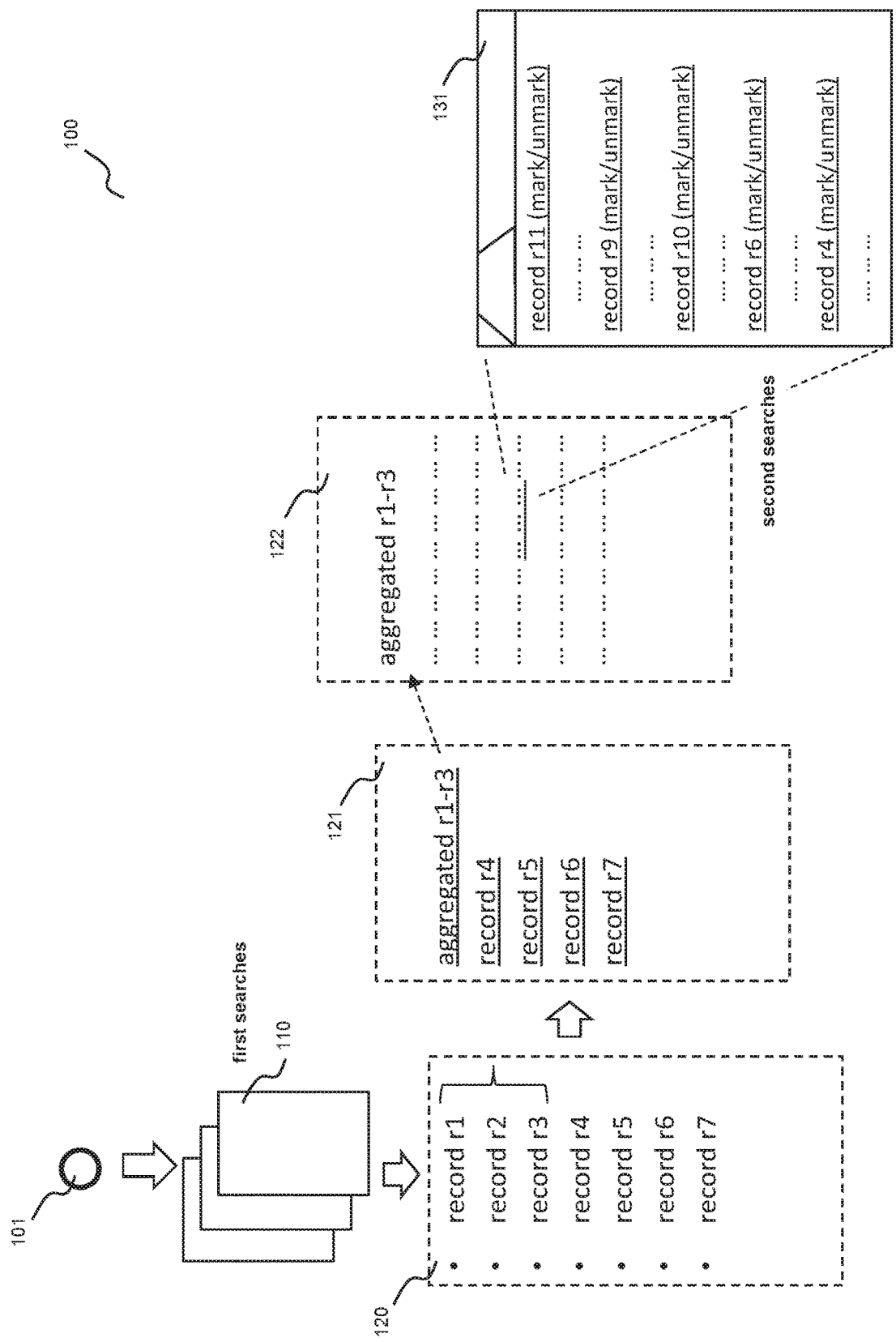
FIG. 1 illustrates a procedure for obtaining, compiling and presenting information relating to an entity for user analysis.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Information relating to entities, such as a subject of an investigation, is scattered in different databases. Different records of an entity, such as financial transactions, are often stored individually rather than collectively, which makes the retrieval, visualization and analysis difficult for end users. Moreover, the entities in each record may be identified with different identifications or characteristics of the entity. This further presents a challenge for identifying all relevant information for effective investigation of the entity. Also, redundant or duplicative information about the entity can present challenges for data management or even skew the analysis. A solution is needed for identifying and compiling all available information relating to the entity and enabling an investigator to conduct investigation with the information.

A claimed solution rooted in computer technology overcomes problems specifically arising in the realm of computer technology. In various implementations, a method entails collecting basic information (e.g., name, phone number, date of birth, social security number, email address and address) of an entity and generating one or more search queries. The search queries are used to search against a plurality of data sources for exact as well as approximate matches. The different data sources may be de-centralized, or federated where no master data management systems or defined standards are employed to manage the data sources. All of the matches are collected, and those that most likely relate to the entity (e.g., having perfect matches on name and social security number) are combined into a single record. Optionally, identical records can be merged to remove redundancy.

In some embodiments, additional searches can be formulated based on the initial search results. The search query can include the basic information of the entity as used in the previous step and can also include relevant information returned from the last search. All of the search results can be combined and presented, on a user interface, to an investigator. The search results can be ranked based on significance or relevance, facilitating analysis by the investigator. The interface can also enable the investigator to annotate the search results, and delete certain results as needed. Any annotation or change that the investigator makes can be optionally saved to a library, which can be shared with other investigators or archived for future use.

In some embodiments, all or part of the search results can be added back to a data repository serving to enrich the knowledge of the entity. The addition and accumulation of such added information can improve further searches of the entity. In some embodiments, an alert can be set up by a user such that a search can be carried out on a predetermined schedule and the search results can be presented to the user. In some embodiments, only new results are returned to the user. In some embodiments, the searches are automatically updated to incorporate additional information relating to the entity after such information becomes available from the searches.

The information identified and compiled as described represents a comprehensive collection of information relating to the entity and all the records of the final results represent potential connections between the entity and activities which may be worth further investigation. The present technology, therefore, provides a fast, automated, convenient, and comprehensive method to compile information from different data sources relating to an entity, and to present to an investigator potential connections between data records for investigation.

The term "entity" refers to any real world object that has attributes useful for identifying the object. An entity can be a person or an organization, and can also be an account, a place, or an event. Attributes for the entity include, for example, names, identification number, characteristics and address, without limitation.

The term "database" may refer to any data structure for storing and/or organizing data, including, but not limited to, relational databases (Oracle database, mySQL database, Cassandra database, etc.), spreadsheets, XML files, and text file, among others. In some embodiments, a database schema of a database system is its structure described in a formal language supported by the database management system.

FIG. 1 illustrates a process for identifying and compiling information relating to an entity that is implemented by a computing system. The system receives one or more search queries relating to an entity 101. If the entity is a person, the search queries include certain basic attributes of the person, such as name, social security number, date of birth, email address, address, or passport number, or their combinations.

The searches can be carried out on one or multiple platforms or multiple databases 110. Each database may have different schema, structure, or content of information. Nevertheless, each entry in a database that can be retrieved as relating to the entity can be commonly referred to as a "record". A record for the entity may be a historic record of an action, such as a financial transaction, associated with the entity, or simply some basic information about the entity, e.g., being listed as a registered voter. The searches can be carried out asynchronically or synchronically, and in any manner suitable for the queries and the databases. In some embodiments, the search queries can be broadened up to maximize the chance of returning potentially relevant records, such as using variations of the attributes or wildcards.

The multiple databases, in some embodiments, are parts of a de-centralized database system where a systemically designed database is partitioned into multiple portions each of which can be hosted at a different location. In some embodiments, at least some of the databases are autonomous and thereby constituting part of a federated database system. A federated database system maps multiple autonomous and disparate databases into a single federated database. The disparate databases can be interconnected via a computer network and may be geographically decentralized. In some embodiments, there is no data integration between the disparate databases.

In some embodiments, at least some of the multiple databases are independently hosted and managed, and may have different access control. For instance, the multiple databases may be databases owned or managed by different banks, companies, or government agencies. The present technology, in some embodiments, is configured to interface with each of the disparate or independent databases to identify information that may be related to the entity.

The searches will produce a number of records as potentially relating to the entity, e.g., records r1 through r7, as shown in FIG. 1. Upon retrieval of these records, which can be optionally saved in a computer medium or temporarily kept in the memory 120, the system can conduct certain basic and automated analysis of the records. In the example of FIG. 1, records r1, r2 and r3 have close-to-perfect matches to the attributes of the entity, e.g., with total match of name, data of birth and social security number. Such records are considered to match the attributes of the entities used in the search query with a substantial confidence. "Matching with a substantial confidence" as used herein means that the similarity between one or more attributes (e.g., name, address, social security number) of a record in a search result and one or more attributes used in the search query is statistically significant. In one embodiment, matching with substantial confidence requires a perfect match of at least one attribute. In another embodiment, matching with substantial confidence requires a perfect match of at least two attributes. In one embodiment, matching with substantial confidence requires a perfect match of at least one or two attribute and a partial match of another attribute with a mismatch of no more than one character (e.g., letter or digit), or no more than two characters.

The records that are matched to the entity with a substantial confidence can be considered as belonging to the entity and thus all the information from the records can be combined into a unified record. Optionally, during the compilation, redundant information or records can be merged to reduce redundancy. A "unified record" as used herein refers to a record generated by the system by compiling information from two or more records in the search results. The compilation can collapse attributes that are identical in all of the two or more records. For instance, if every record has the same social security number, then only one social security number needs to be saved in the unified record. On the other hand, for attributes that have variations, (e.g., different addresses or different spelling of first name), the variants are all saved in the unified record.

As shown in FIG. 1, the system conducts automatic compilation for records r1-r3. The compiled record likely includes additional information about the entity that was not apparent before the search. For instance, the search by social security number to return aliases or secondary addresses of the entity. The search by name may return fraudulent password numbers used by the entity. Such additional information (see underlined words in 122) can then be used for a second round of searches. It is likely that the first round of search will return a large number of records, some of important ones of which may be presented late in the list or buried in the list. The second round of search can likely bring such records back to a user's attention. Without limitation, a third, fourth or even more rounds of searches can be carried out to further enrich or refine the information relating to the entity.

With the two or more rounds of searches, the system now has collected information relating to the entity, with each record providing potentially relevant connection to activities of the entity, such as suspicious financial activities. In this context, the entity is now represented by all the information compiled from the search results relating to the entity. Each record represents a "potential connection" between the entity and the activity.

Building and confirming the potential connections can benefit from human input. To this end, the system can present the records on a user interface (e.g., 131) to a user. To further facilitate user analysis, the system can rank the records before presenting them on the user interface. The ranking method may be dependent upon the type of the entity. For instance, for a system that is set up to detect suspicious activities, a record that includes an activity will be ranked higher than a record that only includes basic information about the entity.

When the records, preferably sorted, are presented on the user interface, the interface can optionally further enable the user to mark or annotate the records (as illustrated in FIG. 1). The user can mark a record, say r6, as not relevant to the entity by checking the content of the record, and thereby allowing the record to be deleted from the system. The user may also mark a record, say r11, as highly relevant to the entity and includes important information for further investigation. Such marking also confirms the record as a potential connection to the entity.

With the automated search process carried out by the system and the further input facilitated by the interface provided by the system, this technology provides an efficient approach to build a comprehensive repository of information relating to an entity of interest, and establish potential connections between the entity and activities or transactions of value for further investigation.

Further, upon receiving the annotations from the user, the system can optionally record the annotation in a library for future use or to be shared with other users. The annotations can also serve as feedback for the search and be used to improve the search algorithm. Yet the annotation can further trigger another round of search with information identified by the user as highly important or relevant.

Search alerts can be generated automatically or upon user request, in some embodiments. In one example, upon completion of a search for an entity, the user can request to save the search as an alert. Accordingly, in some embodiments, the search will be automated by the system at a default schedule (e.g., daily or weekly) or at a schedule set by the user. If the schedule search returns information that has a timestamp newer than the previous search time, then an alert is sent (e.g., by email) to the user with the new information. Alternatively, in another example, the new search result is compared to the previous one and any new information is included in the alert.

In some embodiments, the search can be automatically updated, after each search, to include newly discovered information relating to the entity, such as information with a high confidence and/or relevant level. In some embodiments, the update requires confirmation or optimization by the user.

In some embodiments, a search can be requested based on a complex subject. The term "complex subject" as used herein refers to a collection of different types of entities, such as a case report, a transaction record, or security log. Taking a transaction record as an example, the transaction record may include identifying information of multiple persons (e.g., name and SSN), multiple accounts (e.g., account type and number), and locations of transactions (e.g., address, zip code, and branch name). Each of these entities can be subject to a search.

In one embodiment, when a user enters such a complex subject for the search, the system is configured to identify and extract some or all of the entities included in the complex subject and conducts a search for each of the entities. Upon completion of all the searches, the system can compile the search results and present them to the user optionally in a single feed. In some embodiments, the system can use information from the complex subject and/or the search results to understand the relationship and thereby compile and/or present the search results taking advantage of the knowledge of such relationship.

Figure 2:
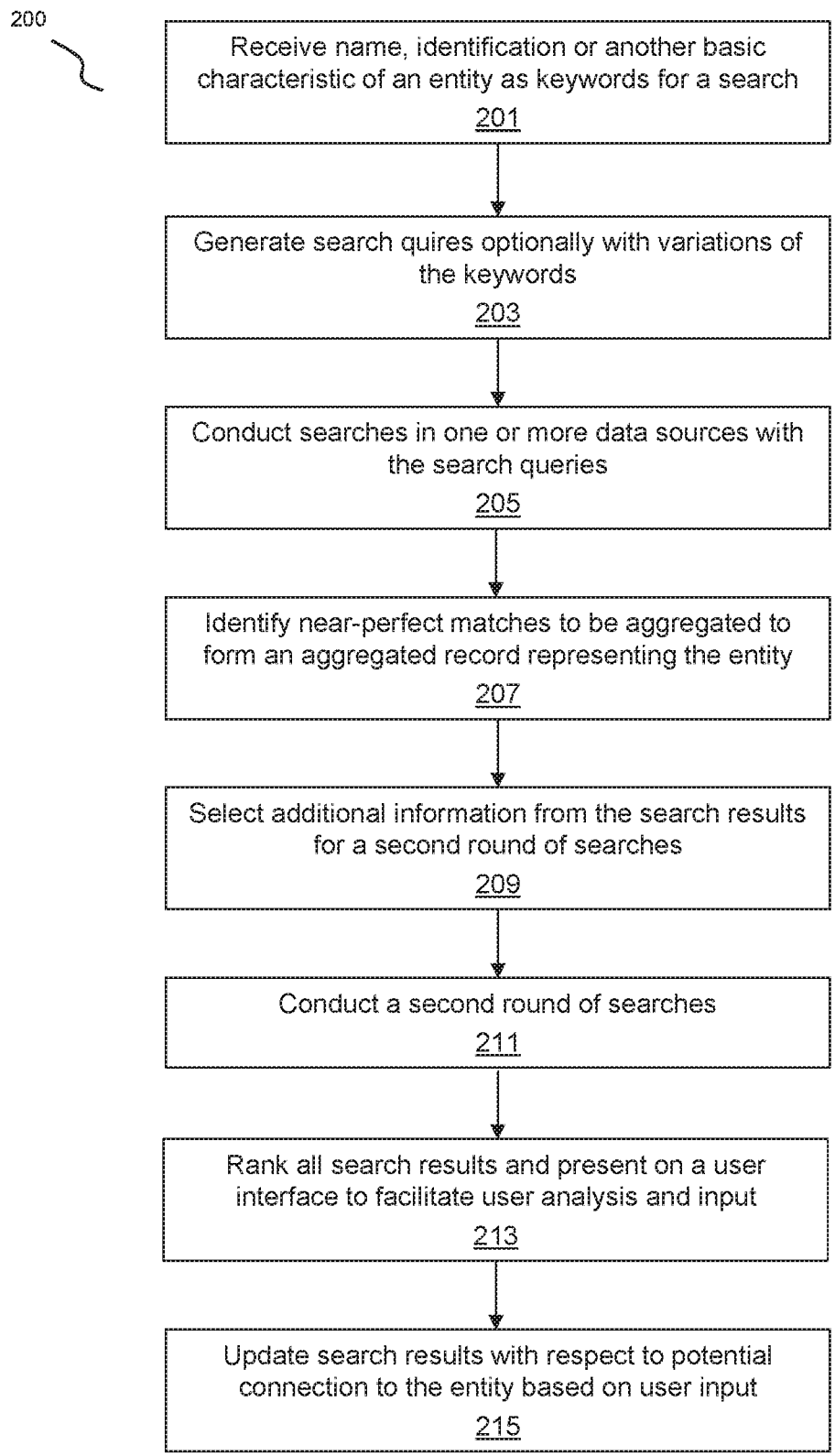
FIG. 2 illustrates a flowchart of an example method for obtaining, compiling and presenting information relating to an entity for user analysis.

FIG. 2 illustrates a flowchart of an example method 200 for identifying and compiling information relating to an entity for investigative analysis, according to various embodiments of the present disclosure. The method 200 may be implemented in various environments including, for example, the system of FIG. 3. The operations of method 200 presented below are intended to be illustrative. Depending on the implementation, the example method 200 may include additional, fewer, or alternative steps performed in various orders or in parallel. The example method 200 may be implemented in various computing systems or devices including one or more processors.

At block 201, a computer system receives name, identification or another basic characteristic of an entity as keywords for a search for information relating to the entity. At block 203, the system generates one or more search quires optionally with variations of the keywords, and then at block 205, the system conducts searches in one or more data sources with the search queries.

Some of the search results would have near-perfect match to the basic information of the entity. Such matches are identified and compiled to form a compiled record representing the entity (block 207). At block 209, additional information from the search results is selected to be used for a second round of searches, followed by the actual searches (block 211). With the second round of searches, all the search results can be presented to a user for further investigation and analysis. Optionally, the search results are ranked to facilitate the user analysis (block 213). Upon receiving user input, the system can update the search results with respect to potential connection to the entity (block 215).

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 3:
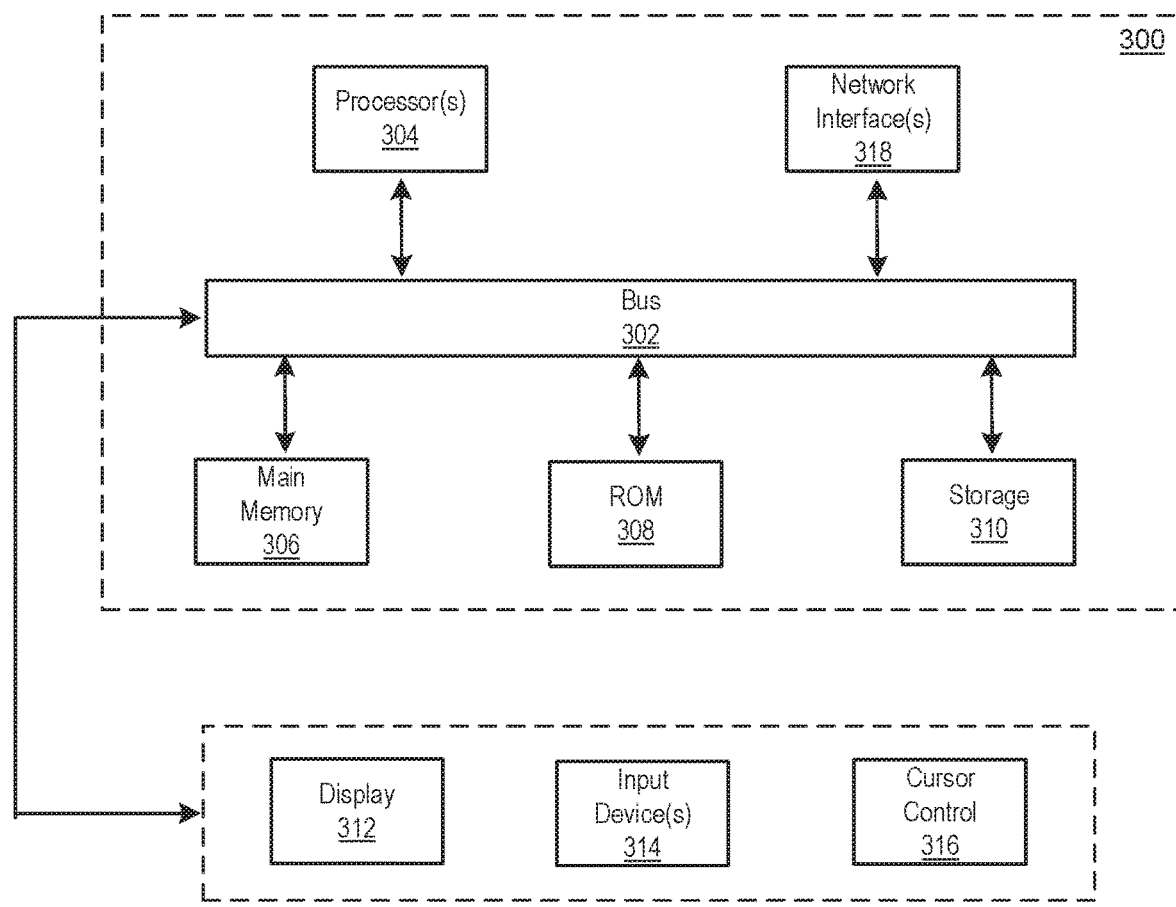
FIG. 3 is a block diagram that illustrates a computer system upon which any of the embodiments described herein may be implemented.

FIG. 3 is a block diagram that illustrates a computer system 300 upon which any of the embodiments described herein may be implemented. The computer system 300 includes a bus 302 or other communication mechanism for communicating information, one or more hardware processors 304 coupled with bus 302 for processing information. Hardware processor(s) 304 may be, for example, one or more general purpose microprocessors.

The computer system 300 also includes a main memory 306, such as a random access memory (RAM), cache and/or other dynamic storage devices, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

The computer system 300 further includes a read only memory (ROM) 308 or other static storage device coupled to bus 302 for storing static information and instructions for processor 304. A storage device 310, such as a magnetic disk, optical disk, or USB thumb drive (Flash drive), etc., is provided and coupled to bus 302 for storing information and instructions.

The computer system 300 may be coupled via bus 302 to a display 312, such as a cathode ray tube (CRT) or LCD display (or touch screen), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor(s) 304 executing one or more sequences of one or more instructions contained in main memory 306. Such instructions may be read into main memory 306 from another storage medium, such as storage device 310. Execution of the sequences of instructions contained in main memory 306 causes processor(s) 304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 310. Volatile media includes dynamic memory, such as main memory 306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may retrieve and execute the instructions. The instructions received by main memory 306 may optionally be stored on storage device 310 either before or after execution by processor 304.

The computer system 300 also includes a communication interface 318 coupled to bus 302. Communication interface 318 provides a two-way data communication coupling to one or more network links that are connected to one or more local networks. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN (or WAN component to communicated with a WAN). Wireless links may also be implemented. In any such implementation, communication interface 318 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 318, which carry the digital data to and from computer system 300, are example forms of transmission media.

The computer system 300 can send messages and receive data, including program code, through the network(s), network link and communication interface 318. In the Internet example, a server might transmit a requested code for an application program through the Internet, the ISP, the local network and the communication interface 318.

The received code may be executed by processor 304 as it is received, and/or stored in storage device 310, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A method being implemented by a computing system including one or more physical processors and storage media storing machine-readable instructions, the method comprising:
   receiving an entry for a subject associated with interactions among entities;
   identifying entities and known characteristics included in the subject;
   searching, in one or more data sources, with a plurality of known characteristics of the subject, to obtain first records;
   identifying, from the first records, a first subset of records that match the known characteristics with a mismatch of no more than a threshold number of characters;
   compiling the first subset of records to form a first unified record representing the subject;
   compiling one or more additional subsets of records from other entity-specific searches that each pertain to a particular entity of the entities;
   identifying additional interactions among the entities from the first subset of records and the additional subset of records;
   distributing at least part of the first unified record or the additional subsets of records back to the one or more data sources;
   presenting, on an interface, at least a portion of the first unified record, the additional subsets of records and the additional interactions;
   conducting a subsequent search to obtain second records, the subsequent search being based on the known characteristics, information from the first unified record, the additional subsets of records, and the additional interactions;
   recording respective first time stamps associated with the first subset of records;
   identifying, from the second records, a second subset of records that are associated with second time stamps that are more recent than the first time stamps;
   compiling the second subset of records to form a second unified record representing the subject; and
   presenting, on an interface, at least a portion of the second unified record.

2. The method of claim 1, further comprising:
   receiving an annotation of a particular record indicating that the particular record is irrelevant; and
   in response to receiving the annotation, excluding the particular record from the second records.

3. The method of claim 1, further comprising receiving an annotation of a particular record and storing the annotation in a library in a non-transitory medium.

4. The method of claim 1, further comprising ranking the first subset of records before presenting the at least the part of the first unified record on the interface.

5. The method of claim 1, wherein the first subset of records have perfect match to the known characteristics.

6. The method of claim 1, further comprising generating variations of the known characteristics as additional queries to obtain the first records.

7. The method of claim 1, further comprising:
   automatically updating the known characteristics of the subject to incorporate additional information relating to the subject that has become available after performing the first search.

8. The method of claim 1, wherein the searching is based on an algorithm, and the method further comprising:
   receiving one or more annotations of one or more particular records, wherein the one or more annotations comprise one or more confirmations that one or more corresponding particular records in the first subset of records are associated with the subject; and
   providing the one or more annotations as feedback to the algorithm.

9. A system comprising:
   one or more processors; and
   memory storing instructions that, when executed by the one or more processors, cause the one or more processors to perform:
   receiving an entry for a subject associated with interactions among entities;
   identifying entities and known characteristics included in the subject;
   searching, in one or more data sources, with a plurality of known characteristics of the subject, to obtain first records;
   identifying, from the first records, a first subset of records that match the known characteristics with a mismatch of no more than a threshold number of characters;
   compiling the first subset of records to form a first unified record representing the subject;
   compiling one or more additional subsets of records from other entity-specific searches that each pertain to a particular entity of the entities;
   identifying additional interactions among the entities from the first subset of records and the additional subset of records;
   distributing at least part of the first unified record or the additional subsets of records back to the one or more data sources;
   presenting, on an interface, at least a portion of the first unified record, the additional subsets of records and the additional interactions;
   conducting a subsequent search to obtain second records, the subsequent search being based on the known characteristics, information from the first unified record, the additional subsets of records, and the additional interactions;
   recording respective first time stamps associated with the first subset of records;
   identifying, from the second records, a second subset of records that are associated with second time stamps that are more recent than the first time stamps;
   compiling the second subset of records to form a second unified record representing the subject; and
   presenting, on an interface, at least a portion of the second unified record.

10. The system of claim 9, wherein the instructions further cause the system to:
   receive an annotation of a particular record indicating that the particular record is irrelevant; and in response to receiving the annotation, exclude the particular record from the second records.

11. The system of claim 9, wherein the instructions further cause the system to:
    receive one or more annotations of one or more particular records, wherein the one or more annotations comprise one or more confirmations that one or more corresponding particular records in the first subset of records are associated with the subject; and
    store the one or more annotations in a library in a non-transitory medium.

12. The system of claim 9, wherein the instructions further cause the system to rank the first subset of records before presenting the at least the part of the first unified record on the interface.

13. The system of claim 9, wherein the first subset of records have perfect match to the known characteristics.

14. The system of claim 9, wherein the instructions further cause the system to generate variations of the known characteristics as additional queries to obtain the first records.

15. A non-transitory computer readable medium comprising instructions that, when executed, cause one or more processors to perform:
    receiving an entry for a subject associated with interactions among entities;
    identifying entities and known characteristics included in the subject;
    searching, in one or more data sources, with a plurality of known characteristics of the subject, to obtain first records;
    identifying, from the first records, a first subset of records that match the known characteristics with a mismatch of no more than a threshold number of characters;
    compiling the first subset of records to form a first unified record representing the subject;
    compiling one or more additional subsets of records from other entity-specific searches that each pertain to a particular entity of the entities;
    identifying additional interactions among the entities from the first subset of records and the additional subset of records;
    distributing at least part of the first unified record or the additional subsets of records back to the one or more data sources;
    presenting, on an interface, at least a portion of the first unified record, the additional subsets of records and the additional interactions;
    conducting a subsequent search to obtain second records, the subsequent search being based on the known characteristics, information from the first unified record, the additional subsets of records, and the additional interactions;
    recording respective first time stamps associated with the first subset of records;
    identifying, from the second records, a second subset of records that are associated with second time stamps that are more recent than the first time stamps;
    compiling the second subset of records to form a second unified record representing the subject; and
    presenting, on an interface, at least a portion of the second unified record.

16. The non-transitory computer readable medium of claim 15, wherein the instructions further cause the system to:
    receive one or more annotations of one or more particular records, wherein the one or more annotations comprise one or more confirmations that one or more corresponding particular records in the first subset of records are associated with the subject.

17. The non-transitory computer readable medium of claim 16, wherein the instructions further cause the one or more processors to store the one or more annotations in a library in a non-transitory medium.

18. The non-transitory computer readable medium of claim 15, wherein the instructions further cause the one or more processors to rank the first subset of records before presenting the at least the part of the first unified record on the interface.

19. The non-transitory computer readable medium of claim 15, wherein the first subset of records have perfect match to the known characteristics.

* * * * *